(12) United States Patent
Kim

(10) Patent No.: US 10,890,321 B2
(45) Date of Patent: Jan. 12, 2021

(54) COMBUSTOR FOR VARIOUS TYPES OF SOLID FUELS

(71) Applicant: Seong Woo Kim, Gyeonggi-do (KR)

(72) Inventor: Seong Woo Kim, Gyeonggi-do (KR)

( * ) Notice: Subject to any disclaimer, the term of this patent is extended or adjusted under 35 U.S.C. 154(b) by 3 days.

(21) Appl. No.: 16/082,276

(22) PCT Filed: Feb. 28, 2017

(86) PCT No.: PCT/KR2017/002196
§ 371 (c)(1),
(2) Date: Sep. 5, 2018

(87) PCT Pub. No.: WO2017/164530
PCT Pub. Date: Sep. 28, 2017

(65) Prior Publication Data
US 2019/0078775 A1    Mar. 14, 2019

(30) Foreign Application Priority Data

Mar. 21, 2016  (KR) ........................ 10-2016-0033097

(51) Int. Cl.
*F23J 11/00* (2006.01)
*F23B 30/00* (2006.01)
(Continued)

(52) U.S. Cl.
CPC ................ *F23B 5/02* (2013.01); *F23B 7/002* (2013.01); *F23B 10/02* (2013.01); *F23B 30/00* (2013.01);
(Continued)

(58) Field of Classification Search
CPC ........... F23K 2400/10; F23K 2400/201; F23K 2900/05004; F23K 5/007; F23K 2203/006;
(Continued)

(56) References Cited

U.S. PATENT DOCUMENTS 4,779,607 A    10/1988  Albertsen
4,836,115 A *   6/1989  MacArthur .............. F23B 1/36
                                                    110/118
(Continued)

FOREIGN PATENT DOCUMENTS

CN        1671994 A     9/2005
DE    102009007458 A1   8/2010
(Continued)

OTHER PUBLICATIONS

Jang English Translation.*
(Continued)

*Primary Examiner* — Jason Lau
(74) *Attorney, Agent, or Firm* — Revolution IP, PLLC

(57) ABSTRACT

A solid fuel combustion device includes: a fuel supply device including a firewood feed pipe or another fuel supplier; a primary combustion chamber coupled to the fuel supply device; a secondary combustion chamber including a wall formed of a fireproof material and having a structure in which a space is formed at a side of the combustion gas outlet of the primary combustion chamber to induce primary combustion gas to be secondarily expanded and combusted; and an air supply system including at least one air supply device in an entire combustion path formed in the primary combustion chamber and the secondary combustion chamber.

7 Claims, 5 Drawing Sheets

(51) Int. Cl.
  *F23B 80/02* (2006.01)
  *F23B 10/02* (2011.01)
  *F23B 80/04* (2006.01)
  *F24B 1/02* (2006.01)
  *F23L 9/02* (2006.01)
  *F23B 90/06* (2011.01)
  *F23L 1/00* (2006.01)
  *F23L 9/04* (2006.01)
  *F23L 15/00* (2006.01)
  *F24B 5/02* (2006.01)
  *F23L 5/02* (2006.01)
  *F24B 5/04* (2006.01)
  *F24B 1/08* (2006.01)
  *F24B 13/04* (2006.01)

(52) U.S. Cl.
  CPC .............. *F23B 80/02* (2013.01); *F23B 80/04* (2013.01); *F23B 90/06* (2013.01); *F23L 1/00* (2013.01); *F23L 5/02* (2013.01); *F23L 9/02* (2013.01); *F23L 9/04* (2013.01); *F23L 15/00* (2013.01); *F24B 1/026* (2013.01); *F24B 1/08* (2013.01); *F24B 5/026* (2013.01); *F24B 5/028* (2013.01); *F24B 5/04* (2013.01); *F24B 13/04* (2013.01); *F23B 2700/018* (2013.01)

(58) Field of Classification Search
  CPC ... F23K 3/02; F23N 5/02; F23N 1/002; F23N 2223/38; F23N 2237/08; F23N 1/00; F23N 1/02; F23N 2229/20; F23N 5/00; F23N 5/022; F23N 5/082; F23N 5/123; F23N 5/203; F24B 1/022; F24B 1/202; F24B 13/04; F24B 1/02; F24B 13/004; F24B 13/006; F24B 13/008; F24B 13/02; F24B 15/005; F24B 1/024; F24B 1/028; F24B 1/22; F24B 1/26; F24B 5/023; F24B 5/08; F23B 2700/013; F23B 50/04; F23B 1/34; F23B 1/38; F23B 20/00; F23B 2900/00001; F23B 50/00; F23B 50/02; F23B 50/10; F23B 50/12; F23B 7/002; F23B 80/00; F23B 8/02; F23G 5/027; F23G 2201/303; F23G 2201/40; F23G 5/46; F23G 2206/203; F23G 5/0276; F23G 5/50; F23G 5/16; F23G 2900/00001; F23G 7/10; F23G 2201/304; F23G 2202/103; F23G 2204/201; F23G 2206/10; F23G 2209/26; F23G 5/0273; F23G 5/085; F23G 5/38; F23G 2900/50001; F23G 5/006; F23G 5/30; F23G 5/32; F23G 5/444; F23G 2202/101; F23G 2202/106; F23G 2202/30; F23G 2203/30; F23G 2203/50; F23G 2205/20; F23G 2207/20; F23G 2900/50204; F23G 2900/50205; F23G 2900/50208; F23G 2900/55007; F23G 5/002; F23G 5/02; F23G 5/04; F23G 5/12; F23G 5/165; F23G 5/442; F23G 7/065; F23G 2201/101; F23G 2201/301; F23G 2201/302; F23G 2202/10; F23G 2202/60; F23G 2203/211; F23G 2203/503; F23G 2203/80; F23G 2204/00; F23G 2204/10; F23G 2204/20; F23G 2205/10; F23G 2205/121; F23G 2205/18; F23G 2206/202; F23G 2207/10; F23G 2207/101; F23G 2207/103; F23G 2207/30; F23G 2207/50; F23G 2209/00; F23G 2209/12; F23G 2209/14; F23G 2209/261; F23G 2209/262; F23G 2900/50002; F23G 2900/50201; F23G 2900/50803; F23G 2900/52001; F23G 2900/52002; F23G 2900/54402; F23G 2900/55003; F23G 2900/55006; F23G 2900/55008; F23G 5/14; F23G 5/20; F23G 5/24; F23G 5/26; F23G 5/448; F23G 5/48; F23G 7/00; F23G 7/001; F23G 7/061; F23G 7/07; F23G 7/105; F23G 7/12; B09B 3/00; B09B 3/0091; B09B 5/00; B09B 1/024; B09B 1/028
  See application file for complete search history.

(56) References Cited

U.S. PATENT DOCUMENTS

| | | | |
|---|---|---|---|
| 6,701,855 | B2 | 3/2004 | Barba |
| 2010/0089295 | A1* | 4/2010 | Moench .................. F23B 30/06 110/346 |
| 2012/0312205 | A1* | 12/2012 | Meeker ..................... F24B 1/26 110/321 |
| 2014/0311477 | A1* | 10/2014 | Davenport .............. F24B 1/028 126/502 |

FOREIGN PATENT DOCUMENTS

| | | |
|---|---|---|
| EP | 2083215 A2 | 7/2009 |
| EP | 2821698 A1 | 1/2015 |
| EP | 3081860 A1 | 10/2016 |
| JP | 2005-207727 A | 8/2005 |
| KR | 10-2013-0035264 A | 4/2013 |
| KR | 20-2013-0004708 U | 8/2013 |
| KR | 10-1391400 B1 | 5/2014 |
| KR | 10-1471636 B1 | 12/2014 |
| KR | 10-1515001 B1 | 5/2015 |

OTHER PUBLICATIONS

International Search Report for PCT/KR2017/002196 dated Jun. 16, 2017 from Korean Intellectual Property Office.
The extended European Search Report dated Oct. 22, 2019.

* cited by examiner

COMBUSTOR FOR VARIOUS TYPES OF SOLID FUELS

TECHNICAL FIELD

The present invention relates to a combustion device capable of combusting biomass fuel including firewood, woodchips, pellets, agricultural by-products and other various solid fuels regardless of kinds thereof by increasing a combustion efficiency through a method of thermally decomposing a solid fuel by returning directly heat generated by secondary combustion of the solid fuel to the fuel.

BACKGROUND ART

Common fuels around us are mostly solid type fuels except for petroleum gas, which is a fossil fuel. Accordingly, combustion of the solid fuel will be primarily described, analyzed, and reflected on a new combustor for various types of solid fuels.

FIG. 1 is a view for analyzing combustion of firewood, that is, a bonfire, under a condition in which a sufficient amount of air is supplied. A region A is a region in which wood gas generated and fumed by thermally decomposing firewood comes into contact with air and is primarily combusted. Some primary combustion heat thereof is an important factor in continuously combusting by returning to the wood and being used as an energy source which thermally decomposes the wood. The remaining primary combustion heat is radiated in all directions. A region B is an expansion and combustion region in which an oxidation reaction occurs between wood gas which is not combusted and air in order to generate heat and light and increase a temperature of a combustion gas. A large amount of thermal energy generated in this region is emitted to a space by radiation and convection, and only a small amount of energy returns to the wood and is used for thermal decomposition. A region C is an end portion of a combustion flame in which a temperature is highest among the regions of the bonfire flame. Energy generated in the region C mostly does not return to the wood.

In a combustor such as an actual heater, energy generated in the three regions is efficiently used to combust given fuel with a high efficiency for a long time period.

As a specific example, in FIG. 2, each or both of a fireproof heat accumulating material 13 and a fireproof insulating material are stacked around a vicinity of firewood in which primary combustion occurs, heat generated by the primary combustion is accumulated and reflected to return to the wood fuel to facilitate thermal decomposition of the wood fuel and stably maintains a wood combustion reaction with a small amount of primary air 11 without supplying excessive air. In addition, an efficiency and stability of the combustion is achieved by preheating and supplying air through a suitable heat exchanger 15 using the combustion heat of the regions B and C. Meanwhile, according to Korean Patent Registration No. 10-1471636, a method is disclosed in which pellets which are one type of solid fuels are combusted, and some of high temperature combustion gas returns as supply air to increase a temperature of the supply air, decrease an oxygen concentration, maintain combustion stability, and dramatically reduce an amount of $NO_x$ generation. The above-described two methods have a common point that the energy is returned by transferring the heat, which is generated in the regions B and C, to the supply air for the combustion reaction. Instead of the method in which the heat generated in the regions B and C is transferred to the supply air, a method in which heat is directly transferred to a solid fuel by conduction and radiation of the heat is disclosed in Korean Unexamined Utility Model Publication No. 20-2013-0004708. Here, in a pocket stove structure which is widely used as a spatial heater for workplaces and the like, after primary combustion and secondary combustion, combustion gas directly returns to a vicinity of a firewood feed pipe and directly acts to heat supplied air and the firewood feed pipe. As illustrated in FIG. 3, the primary combustion is performed at a lower side of the firewood feed pipe, that is a region D, and a combustion flame rises to perform the secondary expansion and combustion, and thus when a vicinity of the firewood feed pipe of a region E is heated, supply air supplied through the pipe is heated and energy is supplied to firewood in contact with the pipe by thermal conduction and radiation. Here, there is a problem of an incongruity in a thermal decomposition region in which thermal decomposition is promoted in the fire wood of the region in which the combustion reaction has to be suppressed. When secondary combustion heat has to be concentrated on the region D, a predetermined amount of firewood is stably combusted for a long time period, but when the secondary combustion heat is transferred to the region E, a firewood combustion time period decreases, and the secondary combustion heat acts as an interference factor for a uniform combustion reaction.

That is, in the combustor in which the fuel is intensively combusted at a certain region using a firewood supply pipe or other fuel supply methods which are not the method in which an entire quantity of fuel is supplied to the combustor at once and combusted illustrated in FIG. 2, a method is not provided in which thermal decomposition of a fuel of a primary combustion region is effectively promoted by switching a combustion gas path to return heat generated by the secondary combustion by conduction and radiation.

DISCLOSURE

Technical Problem

The present invention is directed to providing a combustor operated under a stable combustion condition by switching a combustion gas path to return and supply secondary combustion heat to a fuel by conducting and radiating the fuel so as to stably thermally decompose the fuel.

In addition, the present invention is directed to performing combustion with one combustor regardless of kinds, forms, and sizes of moisture-content fuels by normally maintaining gasification combustion through thermal decomposition of a fuel.

In addition, the present invention is directed to preventing excessive $NO_x$ generation simultaneously while preventing smoke generation corresponding to incomplete combustion because gasification combustion due to thermal decomposition of a fuel is maintained and thus necessary supply air is maintained at a suitable level.

Technical Solution

One aspect of the present invention provides a combustor for various types of solid fuels including: a fuel supply device having a firewood feed pipe or another fuel supplier; a primary combustion chamber coupled to the fuel supply device, wherein a combustion gas outlet formed in one side surface or at a lower side of the primary combustion chamber and the remaining surfaces thereof are blocked by a wall formed of a fireproof material so that primary combustion is performed; a secondary combustion chamber including a wall formed of a fireproof material and having a structure in which a space is formed at a side of the combustion gas outlet of the primary combustion chamber to induce primary combustion gas to be secondarily expanded and combusted, a flow direction of secondary combustion gas is switched after the expansion and combustion to form a path such that the secondary combustion gas comes into contact with and flows along at least one of a lower external wall and a side surface wall of the primary combustion chamber and intensively transfers secondary combustion heat to a fuel in a combustion region of the primary combustion chamber by conduction and radiation; and an air supply system including at least one air supply device in an entire combustion path formed in the primary combustion chamber and the secondary combustion chamber.

The firewood feed pipe may be disposed at an upper portion of the primary combustion chamber and formed in a column shape of which a cross section is a circle, oval, or polygon shape, and a preheating air supply device configured to cool the firewood feed pipe may be added above the primary combustion chamber to increase an efficiency thereof.

The primary combustion chamber wall may be basically formed of a thermally conductive fireproof material, and when a material having a low thermal conductivity is applied to a large combustor having high heat output, an efficiency thereof may increase.

The secondary combustion chamber wall may be basically formed of a fireproof insulating material, but a large combustor having high heat output may be formed of a thermally conductive material to improve an efficiency and stability thereof.

The air supply system may distribute supply air to several positions including an inside of the primary combustion chamber, a start position of the secondary expansion and combustion chamber, and an end position of the secondary combustion chamber so that an output of the combustion device may be adjusted by primary and secondary supply air to reduce $NO_x$ generation and perform complete combustion.

Temperatures in the primary and secondary combustion chambers and exhausted gas detected by an oxygen sensor may be analyzed to electronically control an amount of supply air in order to improve preciseness of air adjustment.

A combustion grid may be disposed in the primary combustion chamber so that the combustion grid may be replaceable by a combustion grid corresponding to a fuel characteristic such that various kinds of fuels are allowed to be combusted.

Advantageous Effects

A solid combustor according to the present invention has an effect in that an amount of $NO_x$ generation and smoke generation due to incomplete combustion is reduced because a stable combustion condition can be provided regardless of a kind, a quality, and the form of a fuel and air supply can be optimized by transferring generated heat to a combustion region in which primary combustion is performed after secondary combustion through a primary combustion chamber wall by conduction radiation, and has an advantage in that a large amount of heat can be output even when a size of the combustor is small.

REFERENCE NUMERALS

Figure 1:
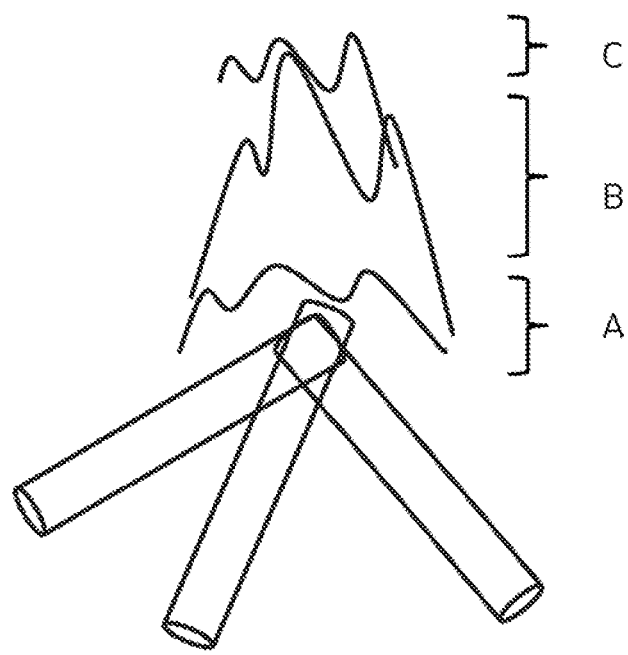
FIG. 1 is a view illustrating combustion regions of a firewood bonfire.
Figure 2:
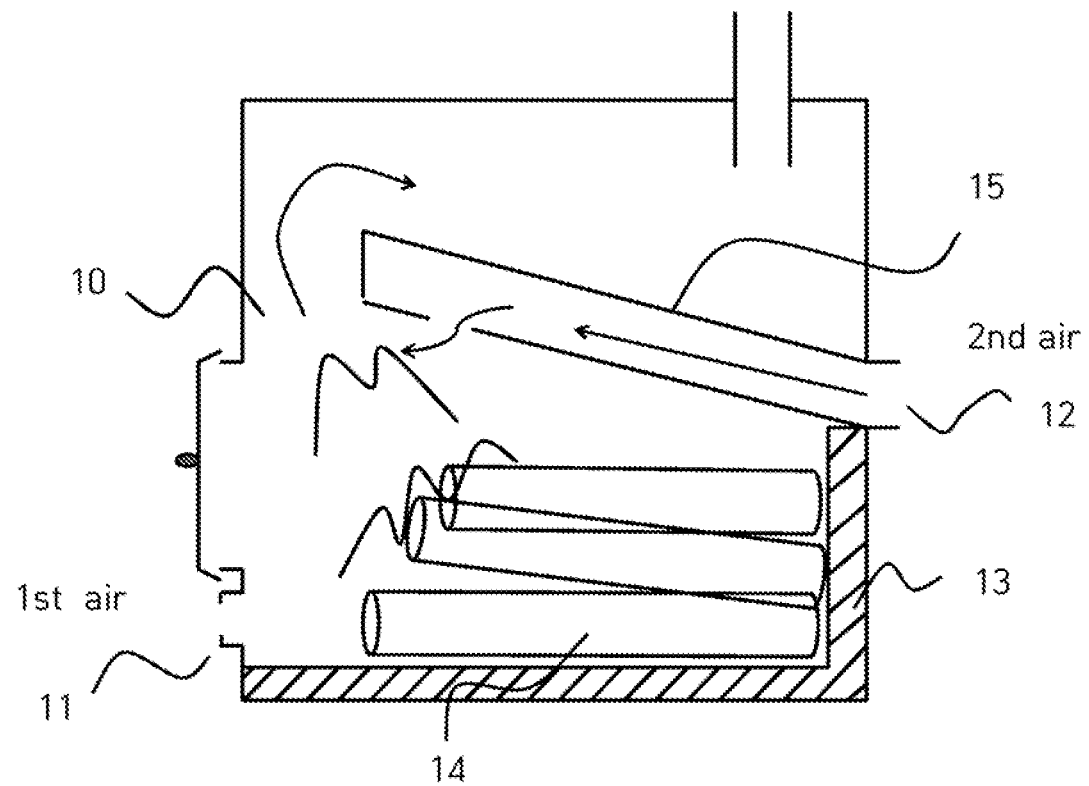
FIG. 2 is a schematic view illustrating a high efficiency firewood stove.
Figure 3:
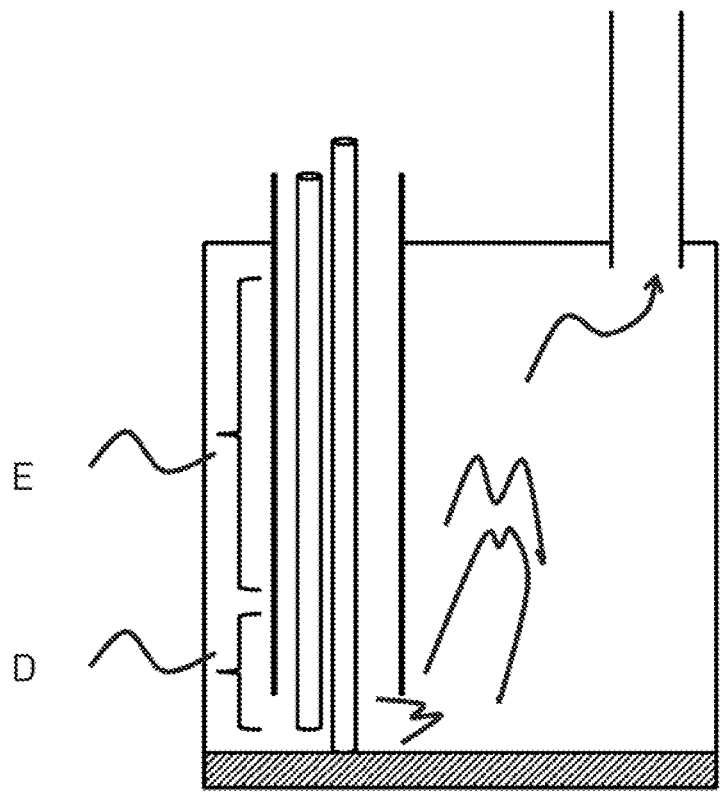
FIG. 3 is a schematic view illustrating a pocket stove.

A: PRIMARY COMBUSTION REGION
B: SECONDARY EXPANSION AND COMBUSTION REGION
C: UPPERMOST COMBUSTION FLAME
D: PRIMARY COMBUSTION REGION
E: SECONDARY EXPANSION AND COMBUSTION REGION
10: SECONDARY EXPANSION AND COMBUSTION
11: PRIMARY SUPPLY AIR
12: SECONDARY SUPPLY AIR
13: FIREPROOF HEAT ACCUMULATING MATERIAL
14: FIREWOOD
15: HEAT DELAY AIR SUPPLY PLATE
20: EXTERNAL HOUSING
21: PREHEATING AIR SUPPLY DEVICE
22: THIRD AIR SUPPLY DEVICE
23: SECONDARY AIR SUPPLY DEVICE
24: SECONDARY COMBUSTION CHAMBER WALL
25: REPROCESSING PORT
26: PRIMARY COMBUSTION CHAMBER WALL
27: PRIMARY COMBUSTION CHAMBER INTERIOR
28: SECONDARY EXPANSION AND COMBUSTION SPACE
29: FIREWOOD SUPPLY PIPE
31: PREHEATING AIR SUPPLY DEVICE
33: SECONDARY AIR SUPPLY DEVICE
34: SECONDARY EXPANSION AND COMBUSTION CHAMBER WALL

MODES OF THE INVENTION

Hereinafter, the technical spirit of the present invention will be described more specifically with reference to the accompanying drawings. The drawings are only examples for more specifically describing the technical sprit of the present invention, and the present invention may be variously applied and used by those skilled in the art.

Expressions of directions in the present invention are defined as that an upper side is referred to as an upper side of each drawing and a lower side is referred to as a lower side of each drawing.

Although a stove which is a simplest type of combustor is mainly illustrated in the drawings, the present invention may be naturally applied to a boiler by additionally installing a water container therewith, a hot blast heater by attaching a heat exchanger thereto, and the like.

Figure 4:
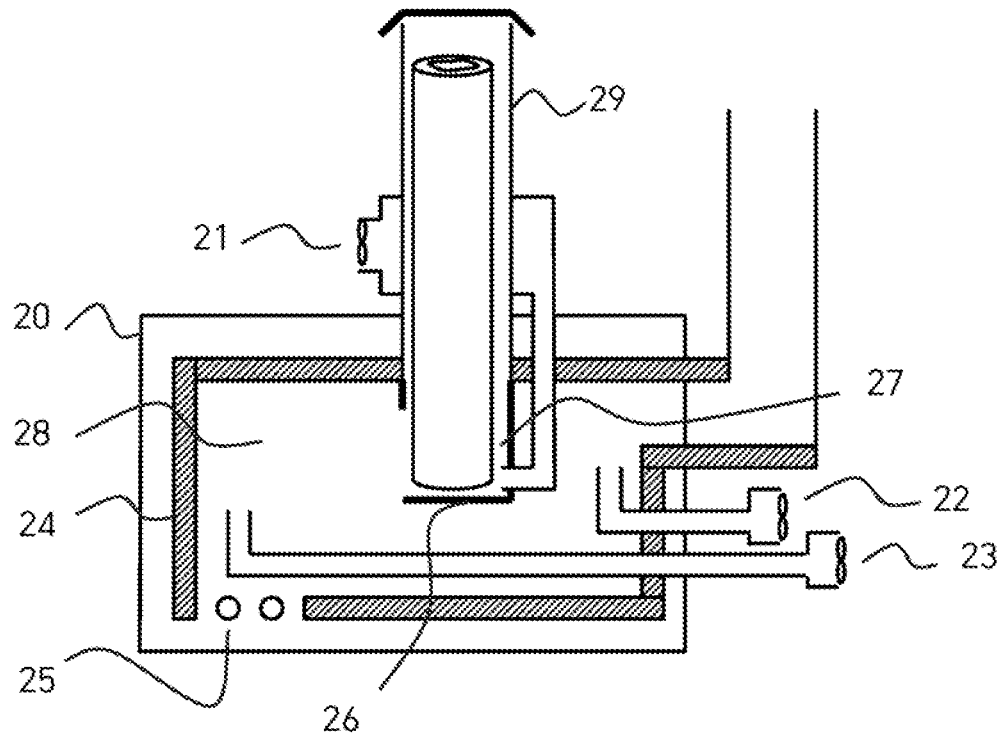
FIG. 4 is a schematic view illustrating a combustion device including a firewood feed pipe and configured to directly return combustion heat.

Referring to components of a combustor in FIG. 4, a firewood feed pipe 29 for supplying a fuel has a column shape of which a cross section is a circle, oval, or polygon shape, various fuels such as firewood, woodchips, and pellets are fundamentally stacked in the firewood feed pipe 29, and the firewood feed pipe 29 serves to continuously supply the fuel to a primary combustion region 27. When an external preheating air supply device 21 is provided around the firewood feed pipe above a combustion chamber, there are effects in that a combustion duration time and combustion stability are improved by preheating air supplied to the combustion chamber to improve a combustion efficiency thereof and simultaneously absorbing and cooling heat coming from the combustion chamber to prevent thermal decomposition of a fuel in a non-combustion region. In addition, a secondary air supply device 23 configured to supply air to a secondary expansion and combustion chamber and a third air supply device 22 configured to supply air after secondary expansion and combustion are included in the combustor.

A heat outlet is formed in one side surface of the primary combustion region 27 formed at a lower end of the fuel supply pipe and another surface 26 in which the heat outlet is not formed is formed of a thermally conductive fireproof material, and when a primary combustion gas is secondarily expanded and combusted, the primary combustion gas comes into direct contact with an outer surface of a primary combustion chamber wall and is turned and flows. Secondary combustion heat is transferred by conduction and radiation through the primary combustion chamber wall 26 and used to thermally decompose a fuel in the primary combustion chamber to maintain continuous gasification combustion. Here, combustion supply air is classified into primary air directly supplied to the primary combustion chamber, secondary air supplied to the secondary expansion and combustion chamber 28, and third air sprayed after the secondary combustion is performed and the secondary air is turned and flows along the primary combustion chamber. In this case, the following effects may occur.

First, in a case in which the combustion chamber is in a cooled state initially, the primary air is directly supplied to a fuel to generate heat so as to increase a temperature in the combustion chamber. Here, an amount of the secondary and third air is minimized to increase the temperature in the combustion chamber. While the temperature in the combustion chamber increases, when an amount of primary air is decreased and an amount of the secondary air is increased, combustion stability is improved, and when a fuel is fully thermally decomposed by secondary combustion heat, the amount of primary air is reduced to a suitable level, the amount of secondary air is increased to decrease an absolute amount of supply air necessary for combustion, and a size of a combustion flame region is increased to adjust an amount of $NO_x$ generation. Here, a minimum amount of the primary air has to be maintained, because a compound containing only carbon is separated and comes out in the form of CO when heat and oxygen are supplied. The third air additionally supplies oxygen to a portion incompletely combusted by only the primary and secondary air to completely combust the portion.

Referring to a mechanism of the combustion, an output of combustion is adjusted by an amount of the primary air and the secondary air, and the third air serves as auxiliary supply air for complete combustion. Here, the primary air is directly sprayed on a fuel to directly adjust the output, and since the secondary air combusts incompletely combusted gas after the primary combustion to generate secondary combustion heat and promote thermal decomposition of the fuel (generating gas) through the primary combustion chamber wall 26, the secondary air directly participates to adjust the heat output. Since the third air combusts incompletely combusted gas after the primary and secondary combustion and discharges generated heat to a rear heat radiation portion, the third air is not related to the adjustment of the output of the combustion. The classification of the supply air into the primary, the secondary, and the third air provides a method in which an amount of $NO_x$ generation due to a high temperature in a small region and supply of excessive amount of air (oxygen) is dramatically reduced because an absolute amount of supply air decreases, and combustion heat disperses over a wide region. Here, a device configured to adjust an amount of supply air is not illustrated in the drawings because of being a known technology, and the secondary and third air may be supplied through the preheating air supply device 21 and may also be supplied through a separated line. Even when the secondary and third air are supplied through the separated line, since the secondary and third air is supplied through a preheated section inside the combustor, combustion stability is maintained.

Here, since a temperature in the secondary expansion and combustion chamber becomes highest and the secondary expansion and combustion chamber serves to switch a heat path in an opposite direction, the secondary expansion and combustion chamber has to be formed of a fireproof material which may withstand high temperatures well, and a material of the secondary combustion chamber wall 24 has to be different from materials of the other components which have different thermal conductivities from that of the material of the secondary combustion chamber wall 24 according to a total size of the combustor. For example, since the combustor for camping installed in a small tent has a small output and a high temperature is difficult to maintain in the combustion chamber, a material of a partition wall has to be a material capable of maximizing a thermal insulation effect to maintain combustion quality. The combustor for a large workplace is formed such that the secondary combustion chamber wall 24 is formed of a thermally conductive material to prevent a temperature in the primary combustion chamber from becoming ultra-high such that secondary combustion gas in which a temperature is lowered through some degree of radiation turns and flows along the primary combustion chamber wall to reduce $NO_x$ generated due to the ultra-high temperature and also protect the primary combustion wall.

A reprocessing device 25 for reprocessing may be formed at a lower portion of the secondary expansion and combustion chamber, and one housing 20 may externally surround an entirety of both the primary and secondary combustion chambers to develop a stove structure configured to directly radiate heat, a boiler structure in which a water container is disposed, a hot blast heater in which an air and heat exchanger is disposed, or the like.

Figure 5:
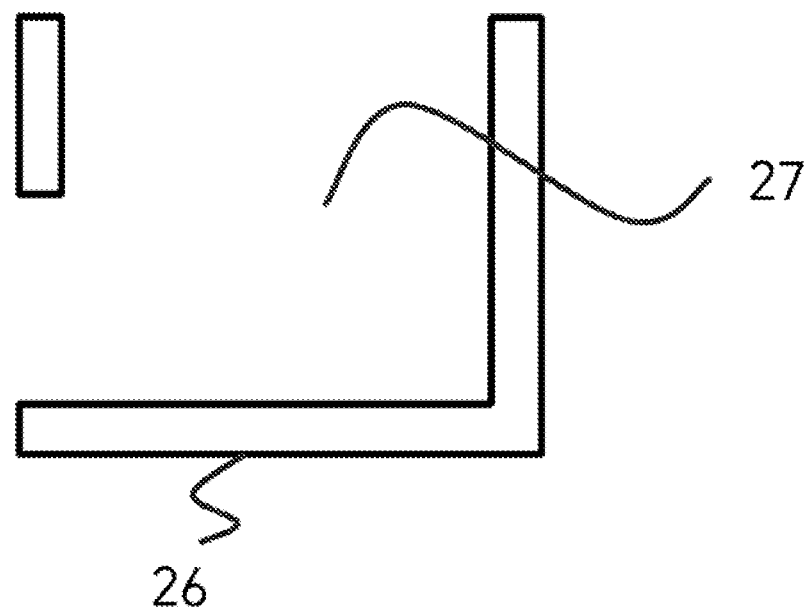
FIG. 5 is a view illustrating another kind of combustion chamber wall of a primary combustion chamber.

FIG. 5 is a view illustrating the primary combustion chamber wall having a structure of a middle air layer. Although the primary combustion chamber wall is basically formed of a thermally conductive material, since excessive secondary combustion heat transferred to the primary combustion chamber causes excessive thermal decomposition in the large combustor of which a thermal output is high, the primary combustion wall having a structure of a middle air layer in which a thermal conductivity is reduced may be suitable for combustion stability. Furthermore, the large combustor may include the primary combustion wall formed of one of various materials including a fireproof brick and the like.

Figure 6:
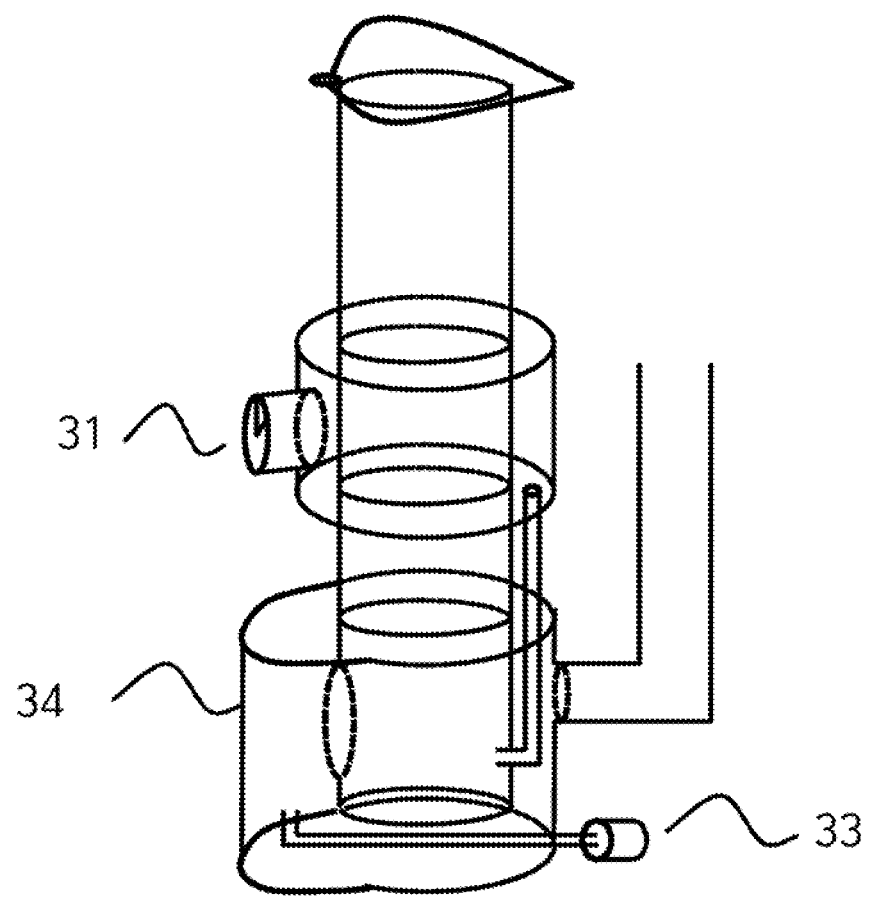
FIG. 6 is a schematic view illustrating a combustion device configured to directly return combustion heat.

FIG. 6 is a schematic view illustrating the above-described combustor when the firewood feed pipe has a circular structure. According to this structure, secondary combustion gas turns and flows along bottom and both side surfaces of the primary combustion chamber toward a rear heat outlet, the path is formed along a lower side of the primary combustion chamber when the both side surfaces of the heat path are formed to be extremely narrow, and the path is formed along the both side surfaces when the path along the bottom surface is highly reduced. Furthermore, the primary combustion chamber may also be variously formed such that one side surface of the both side surfaces is formed to be wide and the other side surface thereof is formed to be narrow.

Although an example of the firewood feed pipe is illustrated as a circular shape in the schematic view, the firewood feed pipe may be similarly applied as a polygonal structure including a tetragonal firewood feed pipe, and a separate drawing thereof is omitted because of being cleared to those skilled in the art.

Figure 7:
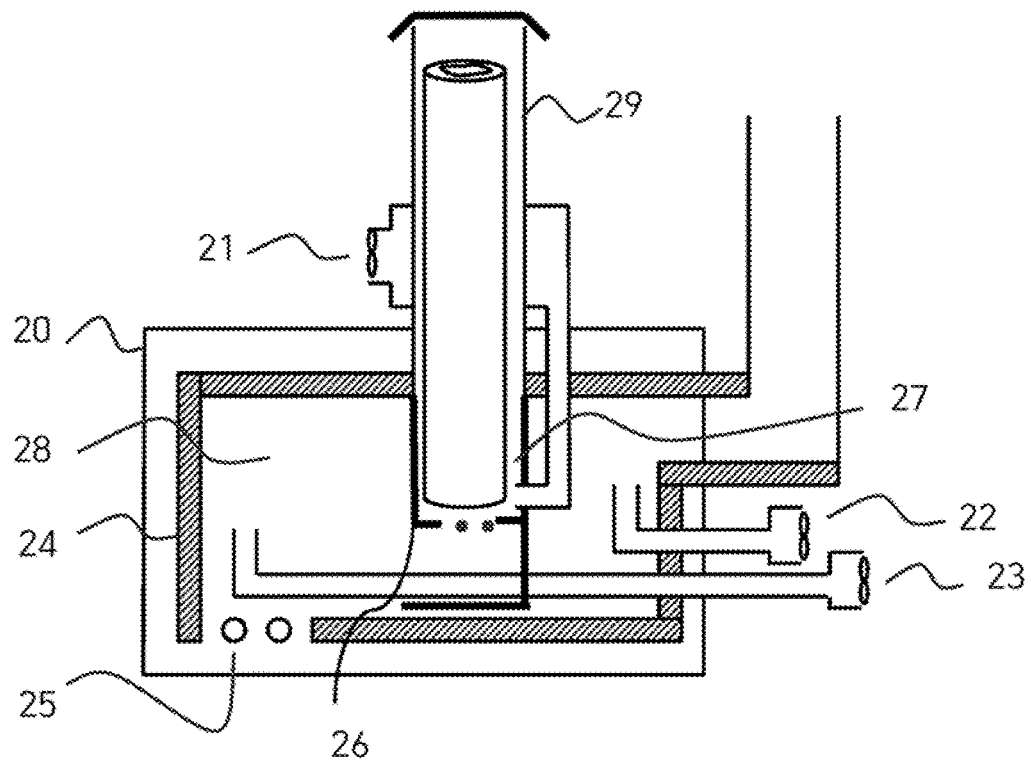
FIG. 7 is a schematic view illustrating a combustion device in which a heat outlet of a primary combustion chamber is formed in a downward direction.

FIG. 7 is a view illustrating a combustor in which an outlet of primary combustion gas is positioned at a lower side of the combustor, and combustion gas is transferred to a primary combustion chamber mainly along both side surfaces of the primary combustion chamber after secondary expansion and combustion.

Figure 8:
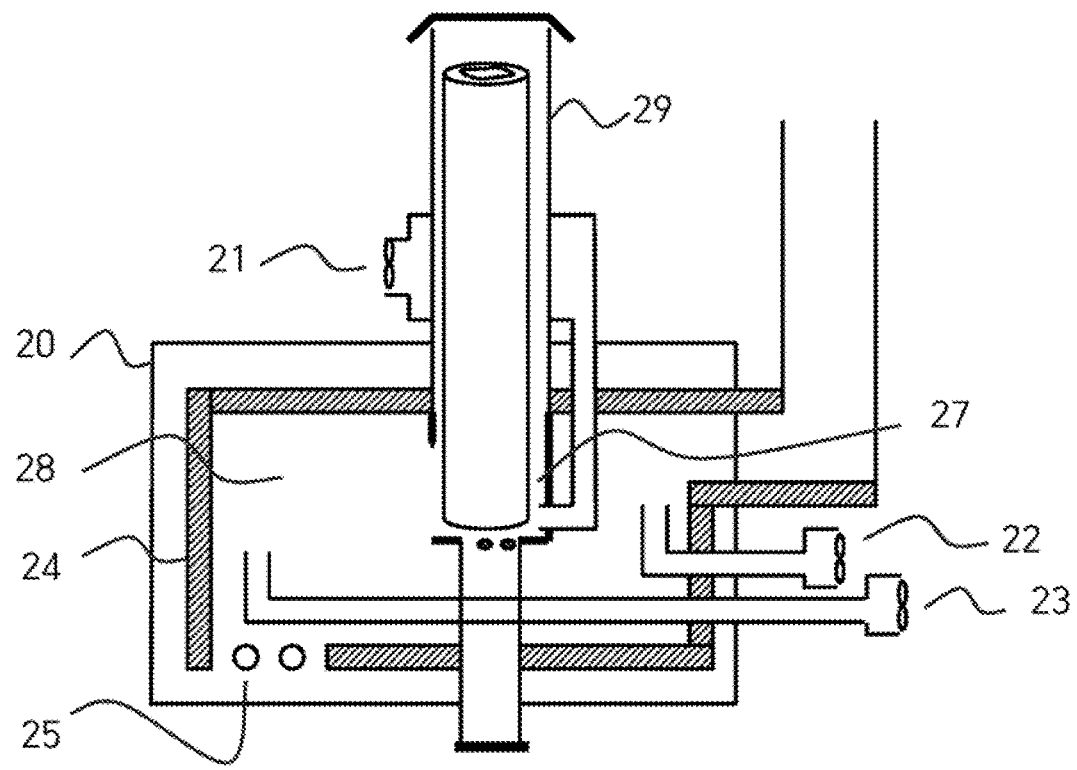
FIG. 8 is a schematic view illustrating a primary combustion chamber to which a reprocessing grid is added.

FIG. 8 is a schematic view illustrating a combustor in which a reprocessing grid is additionally disposed under a primary combustion chamber to increase combustion stability by rapidly reprocessing a fuel from which a large amount of reprocessing fuel is generated during combustion.

Figure 9:
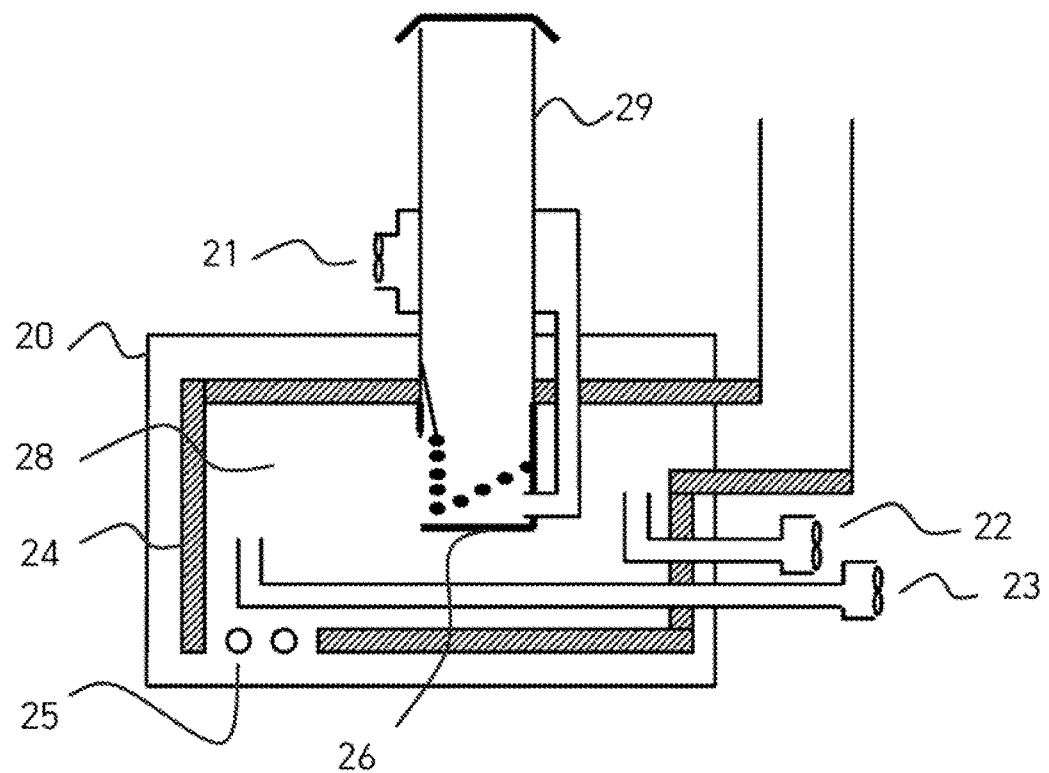
FIG. 9 is a schematic view illustrating a combustion device to which a pellet and woodchip combustion grid is added.

FIG. 9 is a view illustrating a combustor in which a combustion grid disposed in a primary combustion chamber and configured to effectively combust a fuel such as pellets or woodchips is disposed to be replaceable by a kind of combustion grid corresponding to a fuel characteristic.

Figure 10:
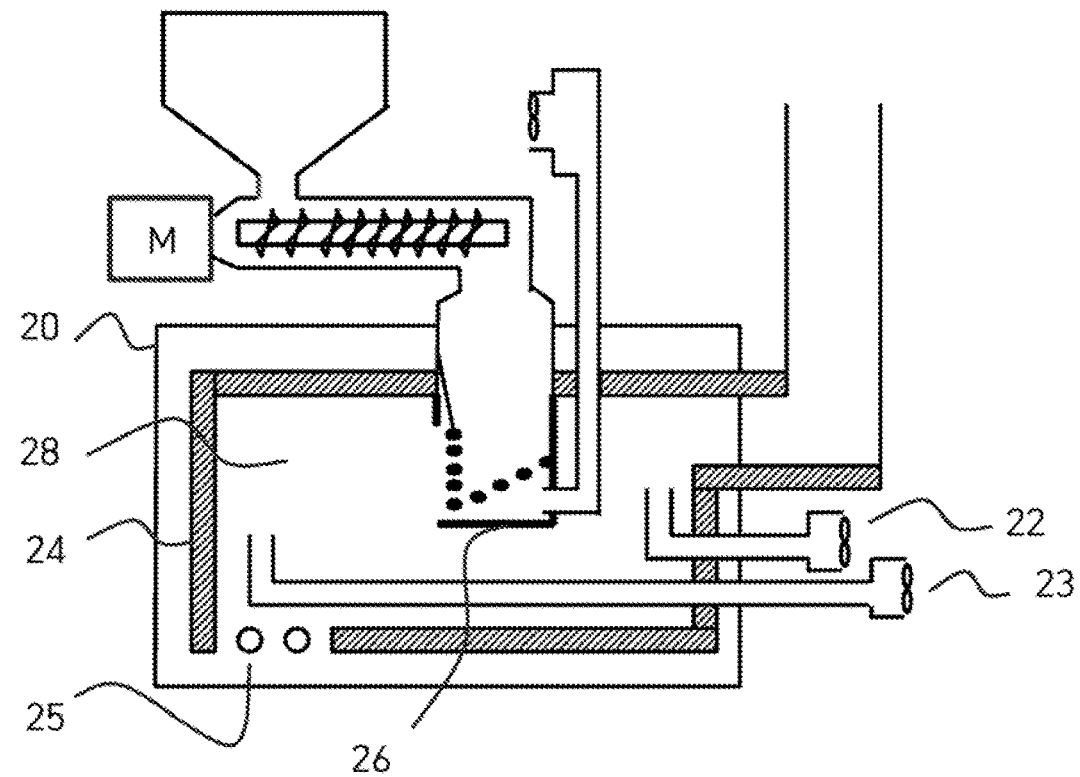
FIG. 10 is a schematic view illustrating a combustion device to which an automatic pellet and woodchip supply device is added.

FIG. 10 is a view illustrating a combustor in which an automated fuel supply system including a transferring screw and a fuel storage hopper is installed instead of a firewood feed pipe. The combustor can operate for a long time period without an additional operation using the automated fuel supply system.

Although not illustrated in the drawing, an oxygen sensor may be added to a side of an outlet of a secondary combustion chamber to more precisely adjust an amount of supply air.

Although not illustrated in the drawings, an amount of air may be adjusted by installing one or more temperature sensors in a primary combustion chamber, a secondary combustion chamber, and a radiation portion and providing an electronic control circuit such that a combustor is operated under conditions of a highly suitable temperature and a most suitable amount of oxygen with information from the oxygen sensor.

The technological scope of the present invention is not limited by the embodiments. The scope of the present invention should be interpreted by the appended claims and encompass all equivalents falling within the scope of the appended claims.

INDUSTRIAL APPLICABILITY

The above-described solid fuel combustor can be variously technically applied to devices from an air heating device such as a firewood stove and a pellet stove, to a water heating device such as a firewood boiler and a pellet boiler, a stove and a boiler configured to combust agricultural by-products, and a burner for a small pollution-free home electricity generator.

The invention claimed is:

1. A solid fuel combustion device comprising:
a fuel supply device including a firewood feed pipe or another fuel supplier;
a primary combustion chamber coupled to the fuel supply device, wherein a combustion gas outlet formed in one side surface or at a lower side of the primary combustion chamber and the remaining surfaces thereof are blocked by a wall formed of a fireproof material so that primary combustion is performed;
a secondary combustion chamber including a wall formed of a fireproof material and having a structure in which a space is formed at a side of the combustion gas outlet of the primary combustion chamber to induce primary combustion gas to be secondarily expanded and combusted, a flow direction of secondary combustion gas is switched after the expansion and combustion to form a path such that the secondary combustion gas comes into contact with and flows along external walls of the entire primary combustion chamber and intensively transfers secondary combustion heat to a fuel in a combustion region of the primary combustion chamber by conduction and radiation; and
an air supply system including at least one air supply device in an entire combustion path formed in the primary combustion chamber and the secondary combustion chamber,
wherein the entire primary combustion chamber is arranged at an upper portion of inside the secondary combustion chamber,
wherein the primary combustion chamber is configured to have at a distance from a bottom surface of the secondary combustion chamber and to expose an entire bottom external wall of the primary combustion chamber inside the secondary combustion chamber,
wherein the combustion gas outlet of the primary combustion chamber is configured to face a first side wall of the secondary combustion chamber, and a combustion gas outlet of the secondary combustion chamber is formed on a second side wall of the secondary combustion chamber opposite to the first side wall so that the secondary combustion gas comes into contact with and flows along the external walls of the entire primary combustion chamber.

2. The solid fuel combustion device of claim 1, wherein:
the firewood feed pipe is disposed at an upper portion of the primary combustion chamber and formed in a column shape of which a cross section is a circle, oval, or polygon shape; and
a preheating air supply device configured to cool the firewood feed pipe is added above the primary combustion chamber to increase an efficiency thereof.

3. The solid fuel combustion device of claim 1, wherein the primary combustion chamber wall is formed of a thermally conductive fireproof material, and when a material having a low thermal conductivity is applied to a combustor having heat output, an efficiency thereof increases.

4. The solid fuel combustion device of claim 1, wherein the secondary combustion chamber wall is formed of a fireproof insulating material, but a combustor having heat output is formed of a thermally conductive material to improve an efficiency and stability thereof.

5. The solid fuel combustion device of claim 1, wherein the air supply system distributes supply air to several positions including an inside of the primary combustion chamber, a start position of the secondary expansion and combustion chamber, and an end position of the secondary combustion chamber so that an output of the combustion device is adjusted by primary and secondary supply air to reduce $NO_x$ generation and perform complete combustion.

6. The solid fuel combustion device of claim 1, wherein a combustion grid is disposed in the primary combustion chamber so that the combustion grid is replaceable by a combustion grid corresponding to a fuel characteristic such that various kinds of fuels are allowed to be combusted.

7. The solid fuel combustion device of claim 1, wherein the fuel supply device is configured to penetrate an upper portion of the secondary combustion chamber, and the primary combustion chamber is configured to be coupled to a lower portion of the fuel supply device inserted into the secondary combustion chamber.

* * * * *